Nov. 27, 1956  E. O. HILLER  2,771,631
APPARATUS FOR RECOVERY OF CRAB MEAT
Filed Nov. 12, 1953  4 Sheets-Sheet 1

INVENTOR
EVERETT O. HILLER
BY John B. Willard
ATTORNEY

Nov. 27, 1956     E. O. HILLER     2,771,631
APPARATUS FOR RECOVERY OF CRAB MEAT
Filed Nov. 12, 1953     4 Sheets-Sheet 2

INVENTOR
EVERETT O. HILLER
BY John B. Willard
ATTORNEY

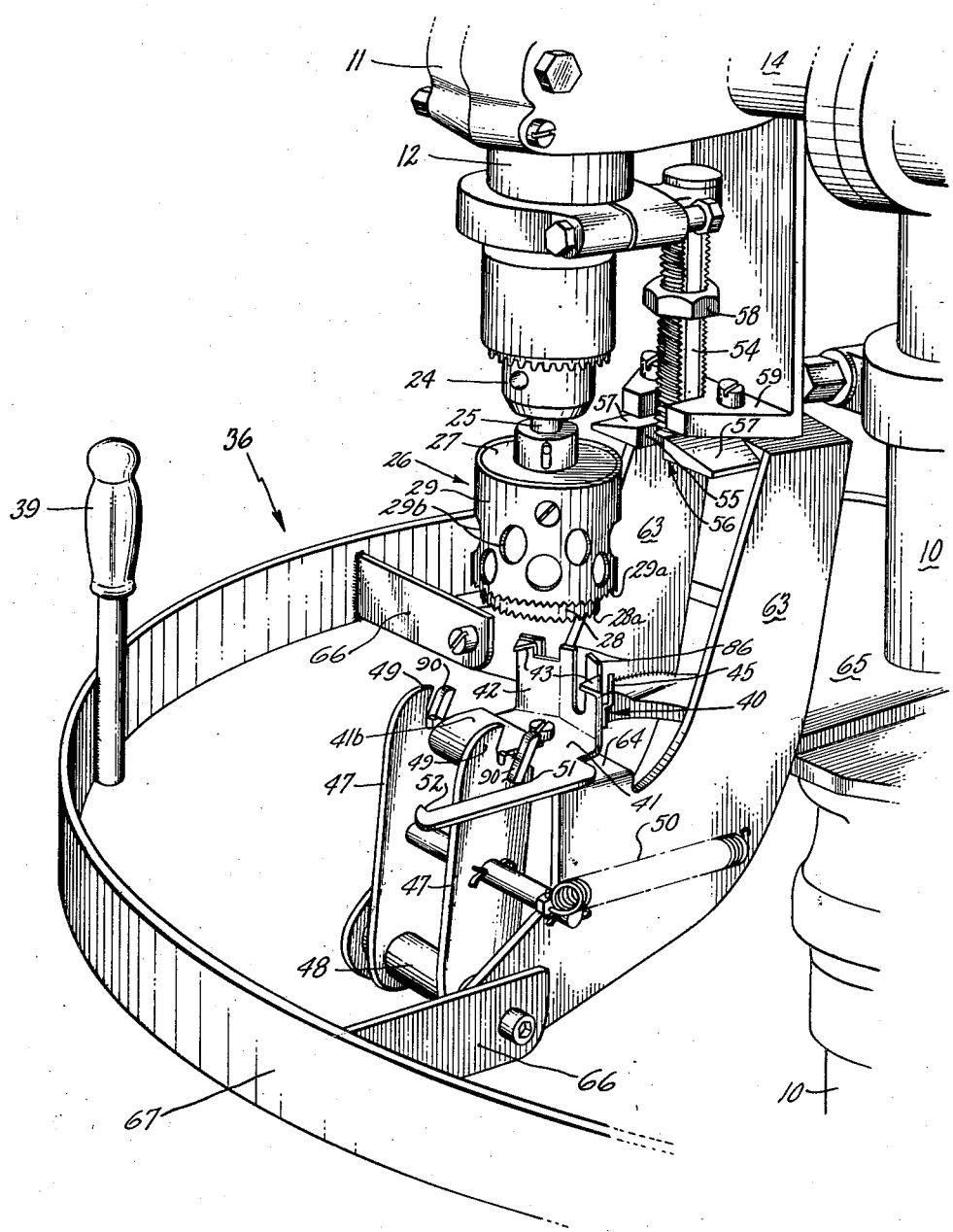

Nov. 27, 1956  E. O. HILLER  2,771,631
APPARATUS FOR RECOVERY OF CRAB MEAT
Filed Nov. 12, 1953  4 Sheets-Sheet 4

INVENTOR
EVERETT O. HILLER
BY John B. Willard
ATTORNEY

United States Patent Office 2,771,631
Patented Nov. 27, 1956

2,771,631

APPARATUS FOR RECOVERY OF CRAB MEAT

Everett O. Hiller, Hyannis, Mass., assignor to Hartford National Bank & Trust Company, Hartford, Conn., as trustee Application November 12, 1953, Serial No. 391,510

12 Claims. (Cl. 17—2)

This invention relates to the recovery of the meat from crabs, such as the common edible crabs of the Atlantic coast of the United States, which are the so-called "blue," "rock," and "sand" crabs. More particularly, the invention provides improved apparatus with which removal of the meat of crabs of the types mentioned may be readily effected.

Crab meat is extremely perishable. Moreover it rapidly becomes discolored to the point where it is unmarketable. Therefore, the operations incident to removal of the meat must be carried on with as great speed as possible.

The recovery of the meat from a crab is a difficult operation, because the interior of its carcass is subdivided by thin irregular partitions into many compartments, some of which contain the meat, while the others contain the viscera. Heretofore, meat has been removed from the crab by manual operations which are relatively slow. The output is small and the labor charge is large. It also has been proposed that the meat containing portion be cored from the crab and the meat thereafter removed from the core. U. S. Patents 2,522,578 and 2,525,604 to Johnson teach that such a core should be made by a cylindrical cutting extending inwardly from the ventral side and terminating at the under surface of the carapace. The core extends into the main visceral cavity directly beneath the carapace and includes a part of the main longitudinal partition within the body and portions of lateral partitions while excluding all of the hinge.

In a core so produced, the meat lies in compartments separated by skeletal parts, and the compartments are open at the circumference of the core cut. Accordingly, upon rotation of the core at high speed on its axis, the meat can be thrown free of the compartments by centrifugal force.

An object of the present invention is to provide improved apparatus for coring crabs.

More particularly it is an object to improve upon the location of the core cut and the cutting operation so as to effect a maximum recovery of the meat without mashing the skeleton or meat or contaminating the latter with the viscera.

A further object is to effect the core cut without rotation of the core.

In accordance with the present invention, a crab, which preferably has been subjected to a preliminary heat treatment, as described in Harris Patent 2,155,308, is cylindrically core cut to the carapace without rotating the core and so as just to include the skeletal hinge between the flipper knuckles at the rear of the crab. Thereafter the core is removed and rotated rapidly about its axis to discharge the meat.

For a better understanding of the invention, reference may be had to the accompanying drawings in which:

Fig. 3 is an enlarged perspective view showing details of the core cutting and crab holding mechanisms;

Figure 1:
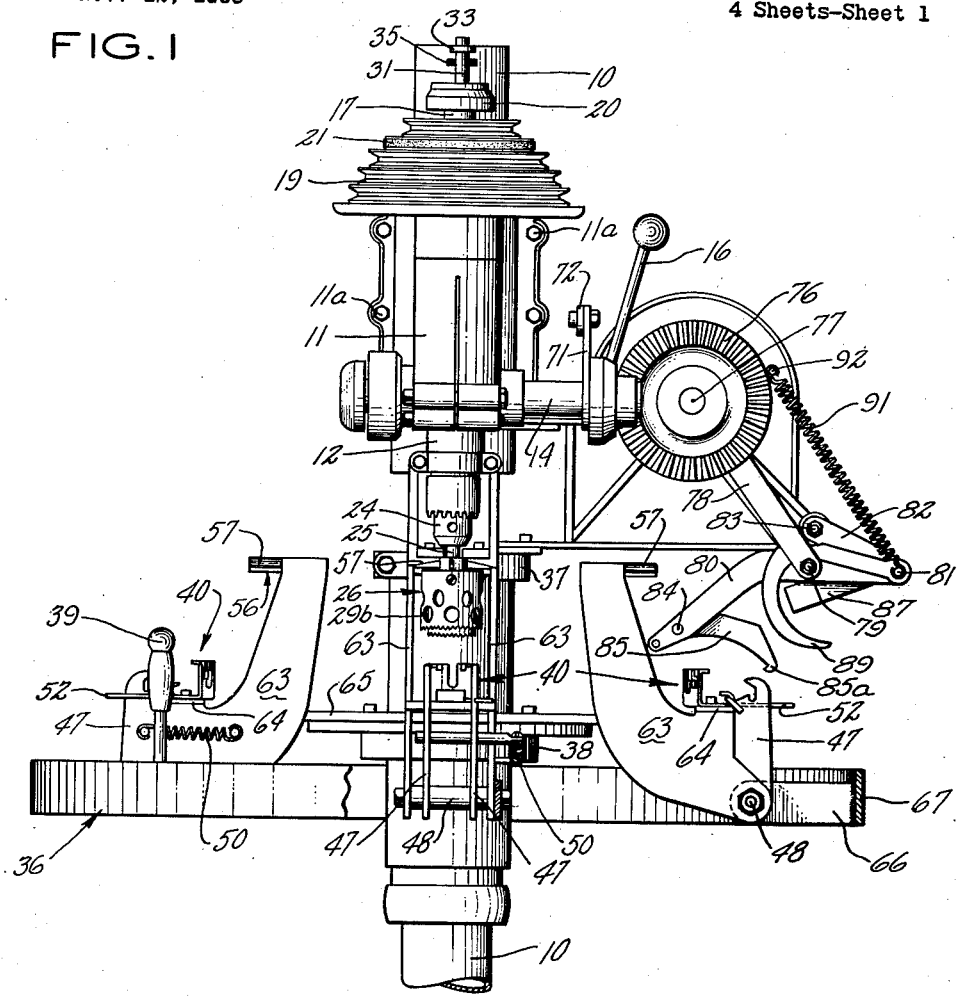
Fig. 1 is a front view in elevation, with portions broken away, of apparatus for locating and coring a crab in accordance with the invention.
Figure 10:
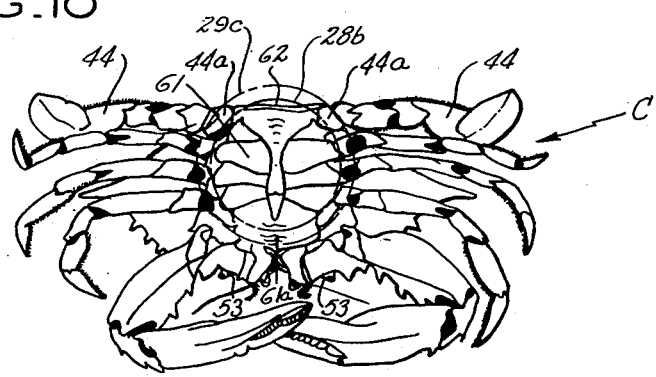
Figure 2:
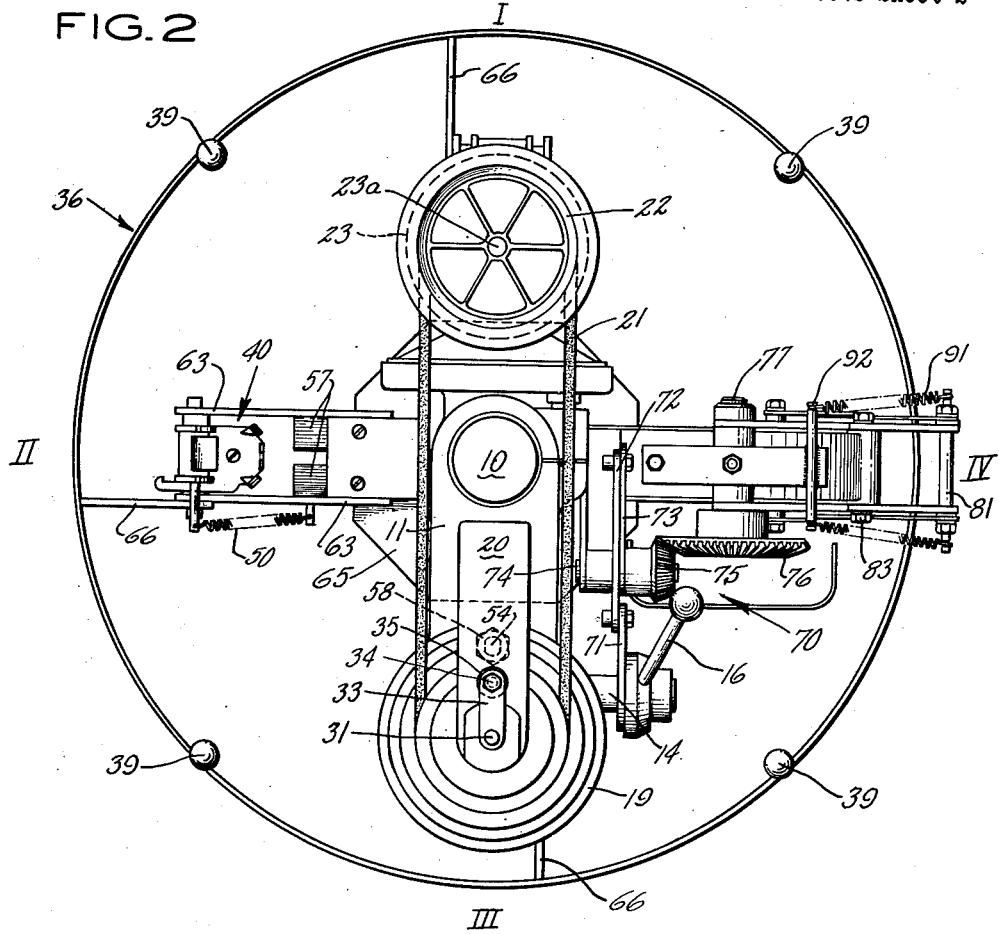
Fig. 2 is a top plan view of the apparatus shown in Fig. 1.

Figs. 6 to 9, inclusive, are enlarged views showing consecutive positions of the portion of the apparatus at the right of Fig. 1 which strips the core and removes the carapace from the machine; and Fig. 10 is a view of a male crab from the ventral or under side of the carapace showing the periphery of a core cut in accordance with the present invention.

The illustrated apparatus comprises a standard post 10 stationarily mounted on a suitable support (not shown) and having a horizontally extending arm 11 rigidly secured at its upper end by clamping bolts 11a. A cylindrical sleeve 12 is mounted for vertical movement along its axis near the outer end of arm 11.

A horizontal stub shaft 14 is rotatably journalled on the arm 11 and carries a pinion which meshes with a rack (not shown) on the sleeve 12. Attached to shaft 14 is a handle 16 with which the shaft 14 may be rotated to raise and lower the sleeve 12. A shaft 17 extends through and is raised and lowered with the sleeve 12. The shaft 17 extends upwardly out of arm 11 and through a pulley 19 which lies between the top of the arm 11 and a fixed bracket 20 and is keyed to the pulley 19 so that the shaft may move freely through the pulley but is held against angular rotation relative thereto. Pulley 19 is driven by a belt 21 from a pulley 22 on the shaft 23a of a motor 23 secured to arm 11 at the rear of the standard 10.

The sleeve 12, shaft 17 and handle 16 normally are held in the positions shown in Fig. 1 by springs (not shown) which permit movement of the handle 16 to both raise and lower the sleeve 12 and the shaft 17 from the positions shown in Figs. 1 and 3.

On its lower end, the shaft 17 carries a chuck 24 in the jaws of which is secured stem 25 of a trepanning tool generally designated 26.

Figure 4:
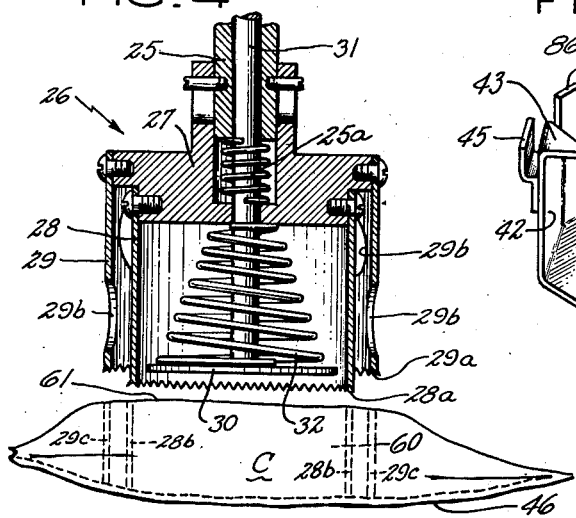
Fig. 4 is an enlarged vertical sectional view of the cutting tool.
Figure 5:
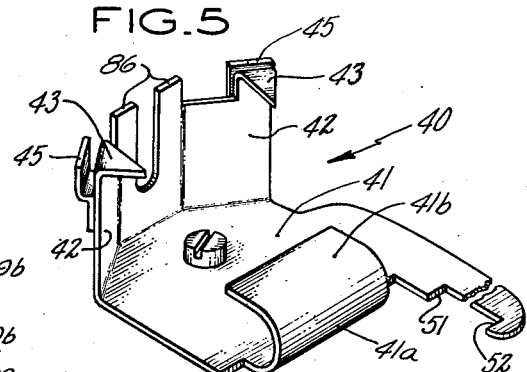
Fig. 5 is an enlarged perspective view of the crab holding member employed in the apparatus.
Figure 6:
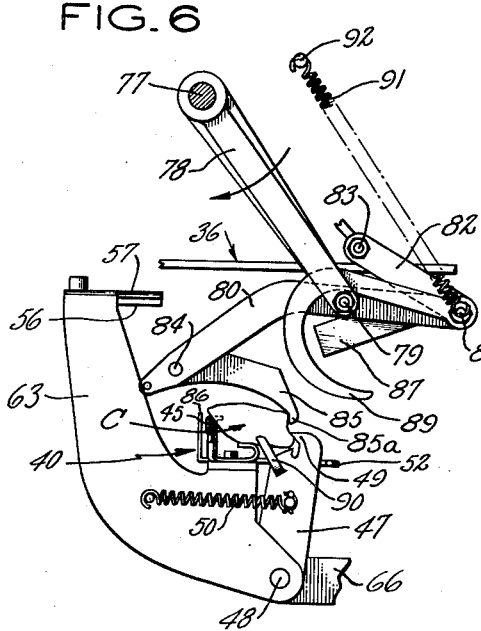

More particularly, as shown in Fig. 4, the tool 26 is of hollow cylindrical form and includes a circular head 27 to which are secured inner and outer concentric cylindrical cutters 28 and 29. The lower edge of each of the cutters 28 and 29 are formed with cutting teeth at 28a and 29a, respectively. The wall of the outer cutter 29 is cut away to form openings 29b which overlap as shown in Figs. 1 and 3 so as to provide opening all the way around the cutter.

Within the inner cutter 28 is a stripper plate 30 which is secured to the lower end of a rod 31 that extends upwardly through the shaft 17. The rod 31 and stripper plate 30 are yieldably urged downwardly by a spring 32. An arm 33 secured to the top of the rod 31 has a downwardly extending pin 34 which is loosely and slidably received within the bracket 20 to prevent rotation while permitting vertical reciprocal movement of the stripper plate 30 and rod 31. A collar stop 35 is adjustably secured on the pin 34 and engages the bracket 20 to retract the stripper plate 30 within the cutter tool 26 as the shaft 25 and cutter 26 are lowered to core cut a crab C.

A turn table generally designated 36 is rotatably mounted on standard 10 and can be swung by handles 39 to locate each of four crab holders 40 successively beneath the tool 26.

More particularly as shown in Figs. 1 to 3 and 6 to 9, inclusive, each crab holder 40 comprises a plate 41 which is secured to a horizontal cross-plate 64 (Fig. 3) that connects the upper ends of a pair of braces 63 which are brazed or otherwise secured to a table 65 rotatably mounted on a collar 38 secured to the standard 10 and connected by links 66 to rim 67 of the turn table 36.

The plate 41 is curved upwardly and inwardly at 41a to provide a table portion 41b for the carapace 46 of the inverted crab C. Each of the plates 41 has a vertical flange 42 from which extend inwardly a pair of spaced prongs 43 that are adapted to pierce the sockets or knuckles 44a of the flippers 44 of the crab C. Outwardly of the back of each prong 43 a bracket 45 is adapted to support a crab flipper 44, the inner cutter blade 28 being adapted to pass between brackets 45 and the flange 42 to which they are secured.

Each crab holder 40 further includes a pair of holder members 47 which are pivoted on a shaft 48 to the braces 63 of the table 65 and which have a pair of prongs 49 pointing at, and pivoted toward the prongs 43 by springs 50 which yieldably press the member 47 against a stop portion 51 of the holder 40. An outer stop 52 limits the movement of the prongs 49 away from the prongs 43.

In the operation of the apparatus thus far described, a crab C, which has been given a preliminary heating treatment, such as that described in Harris Patent 2,155,308, is placed on the table portion 41b of a holder 40 at either of stations I or II with the ventral side of each crab uppermost and with the flippers 44 extending rearwardly over the supporting brackets 45. Thereafter, the crab C is pressed rearwardly to force the prongs 43 into the flipper knuckle sockets 44a. Concurrently, the members 47 are momentarily drawn away from the crab C by hand and immediately released whereupon the members 47 are drawn by the spring 50 toward the crab and the prongs 49 are forced into the eye sockets 53.

If the crab C is too small, the stop 51 prevents sufficient inward movement of the members 47 to snugly grip the crab. If, on the other hand, the member 47 engages the stop 52 and prevents the crab from being seated on the table portion 41b of the holder, the crab is too large. Oversize crabs require a core cut of greater radius to encompass all of the meat cells. Similarly, undersized crabs require a smaller core cut radius so as not to encompass knuckles which block free passage of the meat from the cells.

Assuming that an inverted crab C is snugly gripped by the prongs 43 and 49 in the holder 40, the hand lever 16 (Fig. 1) is pressed rearwardly to raise the sleeve 12 above its normal position and thereby raise a threaded stud 54 which is secured to and extends downwardly from the sleeve 12. Slight upward movement raises the lower end of the stud 54 out of a slot 55 in a plate 56 which is secured to the upper ends of the braces 63, whereupon the frame 36 may be swung to a position a crab C gripped by a holder 40 beneath the cutter 26 at station III. Proper alignment is automatically effected by the stud 54 which is cammed upwardly by a beveled upper surface 57 of the slotted plate 56 and spring returned to its normal position within the slot 55 when aligned therewith so that the cutting tool 26 and the holder 40 are properly aligned.

The motor 23 is then started and with the tool 26 rotating at high speed, the handle 16 is rotated to lower the sleeve 12, shaft 17 and the tool 26 which cuts through the partitions and meat within the body of the crab C along the cutter lines 28b and 29c until the inner and deeper cutter 28 reaches the upper surface of the inverted carapace 46 and cuts the core 60. The main visceral cavity lies just above the inverted carapace within the line 28b. When the annular cut has been completed almost to the carapace 46, a stop nut 58 on the threaded stud 54 engages the top of a stop 59 and prevents further downward movement of the sleeve 12 and shaft 17. Preferably, as shown in Fig. 4, a spring 25a is located between the stem 25 and the cutter head 27 and compressed by the downward movement and engagement of the cutter 26 with the crab C so that when the sleeve 12 is at the bottom of travel permitted by stop nut 58, the final downward travel of the cutter teeth 28a and 29a to the carapace is effected by the spring 25a. Engagement of the non-rotatable stripper plate 30 with the core 60 prevents rotation of the core within the rotating tool 26. In accordance with the invention, the inner cutter 28 moves downwardly within the space between the holder wall 42 and the brackets 45 to cut through the flippers 44. The outer cutter 29 breaks any uncut portions of ventral shell plate 61 at 61a outside the inner core cut 28 along outer cut 29b and detaches the claws and legs from the carapace so that the core 60 may be readily removed in a manner hereinafter described.

Rotation of the core 60 is additionally restrained by the rear hinge portion 62 of the crab which is not cut by the cutting tool 26.

After completion of the core cutting operation at station III, the handle 16 is rotated to raise the sleeve 12 and unlatch the stud 54 from the indexing restraint of the slotted plate 56, whereupon the frame 36 is swung to locate the core cut crab and its holder 40 at station IV and the adjacent holder 40 at station III for a repetition of the core cutting operation.

Rotation of the handle 16 to lower the sleeve 12 and the core cutter 26 also serves through a mechanism generally designated 70 to remove the cut core 60 from the crab C at the station IV and to clear the rest of the crab from the holder 40 preparatory to reloading the holder 40 at station I or II.

More particularly, the mechanism 70 includes a drive consisting of lever 71 secured on the shaft 14 and connected by link 72 to a second lever 73 secured on a stud 74. Rotation of the handle 16 to lower the sleeve 12 also serves to oscillate the links 71—73 and rotate a bevel gear 75 secured to the stud 74 and an intermeshing bevel gear 76 secured to a rotatable shaft 77.

As shown in Figs. 6 to 9, inclusive, rotation of the shaft 77 swings clockwise a lever 78 which is secured to the shaft 77 and pivotally carries at its outer end on a stud 79 a pair of spaced like lever arms 80. The outer ends of the lever arms are pivotally connected by pin 81 to the lower end of links 82 the upper ends of which are pivoted on a stud 83 fixed to the frame 36.

The inner ends of the levers 80 pivotally carry on pin 84 a hook lever 85, the hook end 85a of which is adapted to engage under the shell plate 61 and remove the core 60 from the carapace 46. In removing the core 60, the hook lever 85 is pivoted upwardly on the pin 84 by the core 60 as the core is pivoted and its hinge 62 broken on an underlying fulcrum portion 86 of the holder 40.

The core 60 thereupon drops into an underlying bucket or other receptacle (not shown) and is ready for spinning or other meat removal operations. A presser foot 87 on the lever 80 engages the core 60 and assures that the hinge 62 is broken and that the core is released from the carapace.

Figure 8:
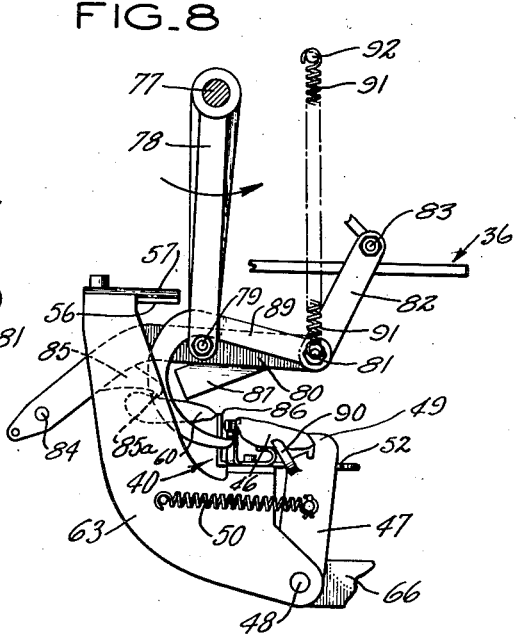
Figure 7:
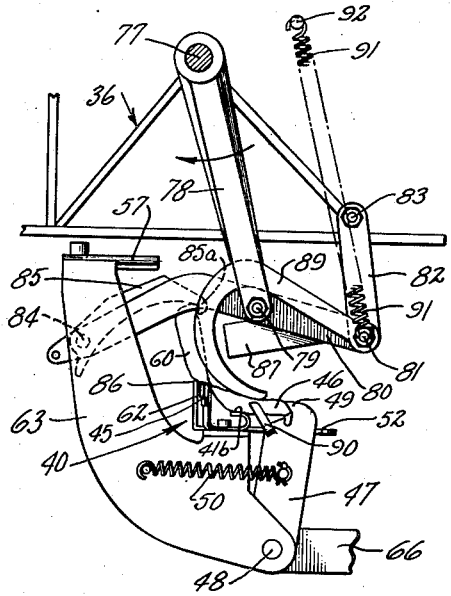
Figure 9:
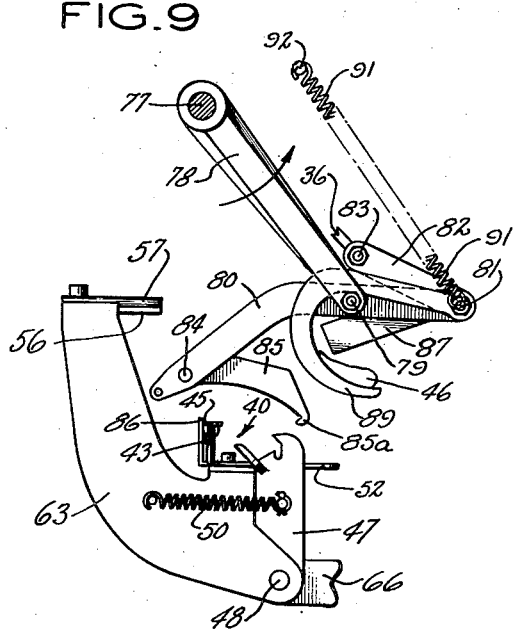

As the hook 85a pivots the core 60 rearwardly to remove the core from the carapace 46 and break the hinge 62, a pair of spaced hooks 89 which are pivoted on the pin 81 ride on and are cammed upwardly by the carapace 46. As the levers 80 more inwardly, the hooks 89 clear the carapace 46 and drop down onto the pin 79 as shown in Fig. 8. Thereafter, the handle 16 is operated to raise the cutter 26 and rotate the shaft 77 counterclockwise (Fig. 8).

In their return movement, the hooks 89 engage cam shoes 90 on the gripping levers 47 and rotate the levers 47 against the action of the spring 50 so that the gripper points 49 are disengaged from the eye sockets of the crab. Thereafter the hooks 89 lift and discard the remaining carcass, leaving the holder 40 clear for loading at station I or II.

A spring 91 is tensioned between the pin 81 and a pin 92 on the frame 36 so that the link 82 moves across the dead center of the spring 91 and the core removing linkage 80 is yieldably held by the spring 91 in both extreme positions until moved therefrom by manual rotation of the handle 16.

Each core 60 produced by the trepanning operation heretofore described includes a portion of the ventral shell of a crab and portions of the internal partitions, which define compartments within the crab body. The meat lies within these compartments and the compartments are open at the circumference of the core.

While the meat may be picked readily from the core 60 by hand, it may be removed even more readily by rotation about the axis of the core, preferably in a cup or other cylinder which supports the shell of the core except at openings aligned with the openings in the skeleton through which the meat is discharged by centrifugal force. The meat thus removed is in large firm lumps unmashed or damaged by the coring and removal operations. Thus the meat may be recovered from the crabs rapidly and effectively. The cutting of a core from a crab by the illustrated apparatus takes only a few seconds, since the tool rotating at high speed encounters little resistance in the cutting operation and can be lowered rapidly into the crab. The removal of the cores from the capapace and the ejection of the latter from the machine is automatic.

The turn table 36 may be power indexed at that completion of a core cutting and removal operation and, if desired, the cutting and removal operation may be power driven rather than manual.

If desired, the turn table 36 may be provided with a greater or lesser number of holders 40, so that while the crab in one holder is being cored, a greater or lesser number of crabs may be loaded in the other holders. The removal of the meat from the cores by centrifugal action is highly effective and a spinning operation of only short duration is required for the purpose. The meat recovered is substantially free of bone and shell and is ready for the subsequent dipping and other operations incidental to canning.

The diameter of the inner cutting tool 28 should be such that the annular cut lies just within the knuckles of the crab and so as to just include the hinge 62 in order that the maximum amount of meat will be contained in the cores. While crabs vary somewhat in their dimensions, two sizes of cutting tools ordinarily are sufficient for the different size crabs that are ordinarily encountered in Atlantic waters.

Openings 29b in the outer cutter 29 are so disposed that although at different elevations they provide openings throughout all 360° of the cutter. Consequently all matter wedged between the inner and outer cutters 28 and 29 during the cutting operation is eventually pushed by subsequent material to an elevation where one of the openings is located and is discharged therethrough by centrifugal force. Thus the space between the two cutters is self cleaning and can not become filled so as to prevent further reception of material therebetween.

Having thus described an embodiment of the invention which is illustrative only, I claim:

1. In a crab holding and core cutting device, a support for the carapace of an inverted crab, a first pair of prongs associated with the support and spaced to be received by the flipper sockets of the supported crab, a second pair of prongs associated with the support and movable into the eye sockets of the supported crab, spring means pressing said pairs of prongs toward each other to grip the crab therebetween, and a rotatable cylindrical cutter aligned with said crab support and movable into and out of cutting engagement with the supported and gripped crab.

2. The device recited in claim 1 and including stop means associated with the prongs for limiting the movement of one pair of prongs relative to the other pair.

3. The device recited in claim 1 including means associated with the support for supporting the flippers of the crab on opposite sides of the cutter.

4. In a crab holding and core cutting device, a support for the carapace of an inverted crab, means associated with the support for holding said crab on said support, a rotatable cylindrical cutter aligned with said crab support and movable into and out of core cutting engagement with the supported crab, stop means associated with the cutter for restraining downward travel of the cutter and preventing engagement of the cutter and the carapace of the crab on said support, and means associated with the cutter for preventing rotation of a cut core by the cutter.

5. In a crab holding and core cutting device, a support for the carapace of an inverted crab, means associated with the support for holding said crab on said support, a rotatable cylindrical cutter aligned with said crab support and movable into and out of core cutting engagement with the supported crab, stop means associated with the cutter for restraining downward travel of the cutter and preventing engagement of the cutter and the carapace of the crab on said support, and means associated with the cutter for resiliently forcing the cutter downwardly beyond the position which it has when said stop means initially restrains its downward movement.

6. In a crab holding and core cutting device, a support for the carapace of an inverted crab, means associated with the support for holding said crab on said support, a rotatable cylindrical cutter aligned with said crab support and movable into and out of cutting engagement with the supported crab, said cutter including a stripper plate for ejecting a cut core from the cutter and holding the core on the carapace while the cutter is raised out of cutting engagement with the crab.

7. In a crab holding and core cutting device, a support for the carapace of an inverted crab, means associated with the support for holding said crab on the support, a rotatable cylindrical cutter, means associated with the support for moving said support and crab into and out of cutting alignment with the cutter, means associated with said moving means for releasably stationing said support in alignment with the cutter, means associated with the cutter for moving the cutter into and out of cutting engagement with the supported crab, and operable means associated with the support for stripping a cut core from the carapace at a station removed from the cutting station.

8. The device recited in Claim 7 and wherein said stripper means is associated with and responsive to movement of said cutter into and out of cutting engagement with the crab.

9. The device recited in Claim 8 and including a fulcrum member on said support and underlying the hinge portion of the crab, and wherein said stripper means includes a hook engageable with the cut core to break the connecting hinge portion and separate the core from the carapace.

10. The device recited in Claim 9 and wherein said hook is operated to break the hinge portion responsive to travel of the cutter to cutting position.

11. The device recited in Claim 10 and wherein said stripper means includes means for removing the carapace from the support responsive to movement of the cutter away from cutting position.

12. In a crab holding and core cutting device, a rotatable holder having a plurality of spaced supports each of which is adapted to support the carapace of an inverted crab, holding means associated with each support releasably engageable with the eye and flipper sockets of the supported crab, a rotatable cylindrical cutter movable into and out of cutting engagement with a crab held on one of said supports, means associated with the supports for indexing said supports in core-cutting position relative to said cutter, means associated with the cutter for moving said cutter into and out of core cutting position, means associated with the support and responsive to movement of the cutter to cutting position for stripping a core from a carapace at a station removed from the core cutting position, and means associated with the support and responsive to movement of the cutter away from its cutting position for disengaging the holding means from the crab and removing the carapace from the support at said removed station.

References Cited in the file of this patent

UNITED STATES PATENTS

| | | |
|---|---|---|
| 2,502,091 | Harris et al. | Mar 28, 1950 |
| 2,522,578 | Johnson | Sept. 19, 1950 |